Nov. 16, 1937.   N. H. WHITLOCK   2,099,247
PIE MAKING AND AUTOMATIC BAKING MACHINE COMBINED
Filed April 24, 1936   4 Sheets-Sheet 3

INVENTOR
NEIL H. WHITLOCK
BY
ATTORNEY

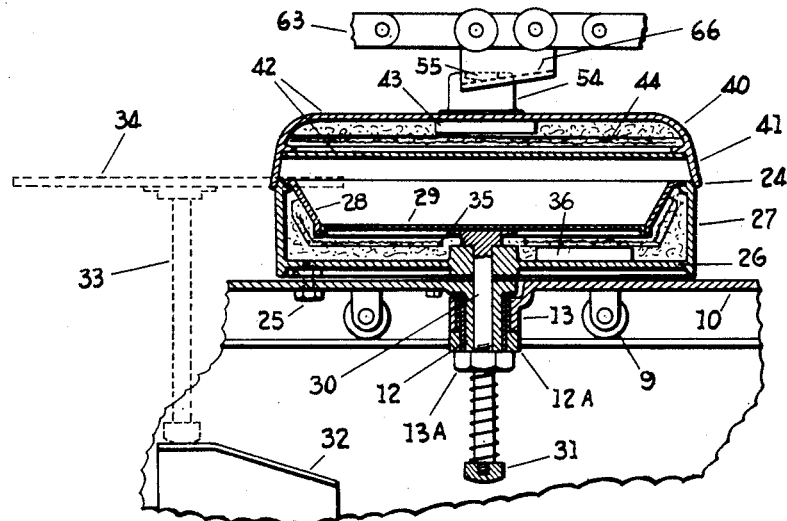
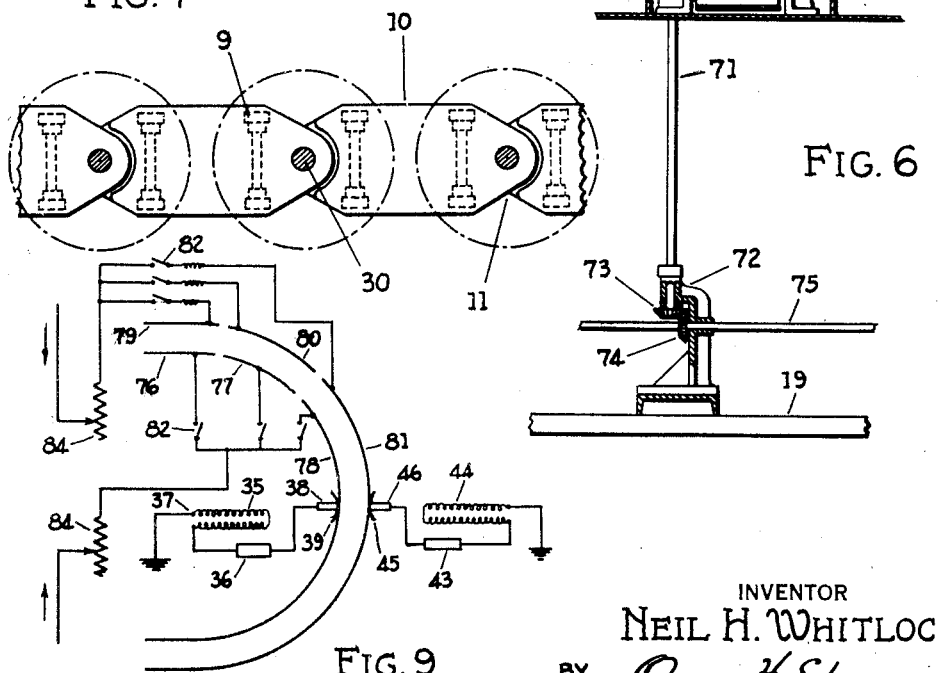

Patented Nov. 16, 1937

2,099,247

UNITED STATES PATENT OFFICE 2,099,247

PIE MAKING AND AUTOMATIC BAKING MACHINE COMBINED

Neil H. Whitlock, Indianapolis, Ind.

Application April 24, 1936, Serial No. 76,175

14 Claims. (Cl. 219—19)

The invention is an electrical baking machine using a series of progressively operated baking units the mechanism as an entirety being adapted to continuous operation; and the invention consists substantially in the construction, combination, and arrangement of elements hereinafter pointed out and recited more particularly in the claims.

It is a primary object to provide an invention more especially for baking pies each baking unit baking in order of its movements in relation to the adjoining units of the series.

It is also a primary object to provide a moving chain of baking ovens each of which travels in turn along a pie receiving station and thence through a baking zone to the pie removing station.

It is an important object to provide a series of independent electrical baking units operated one after the other in turn and each having its particular electrical heating element, each of said units having an electrical brush connection, and to provide a fixed trolley bar against which said brush connections bear during the baking period of the respective units.

It is a further object to provide a moving chain of baking ovens each of which travels in turn along a pie receiving station and thence through a baking zone to the pie removing station; and to provide a chain of oven lids having independent heating elements and which travel in registration with said chain of ovens through the baking zone but which otherwise travel in a route to by-pass said pie removing and receiving stations.

It is also an object to provide in conjunction with an invention of this class a separate and independently regulatable safety heat control for such individual oven and lid, to keep the temperature within tolerable limits.

It is also an object to provide means to both vary the baking time and heat of the aforesaid baking units.

The above and other objects are attained by the structure illustrated in the accompanying drawings in which:

Fig. 5 is a detailed sectional view of one of the baking units taken approximately on line 5—5 of Fig. 2;

Fig. 6 is a fragmentary sectional view taken in the proximity of line 6—6 of Fig. 4;

Fig. 7 is a detailed view of a part of the connecting linkage which serves as the carrying part of the chain of baking units;

Fig. 8 is a fragmentary detailed view of a part of the drive gearing; and,

Fig. 9 is a wiring diagram for the electrical parts of the invention.

Similar characters of reference designate similar parts throughout the different views.

Figure 1:
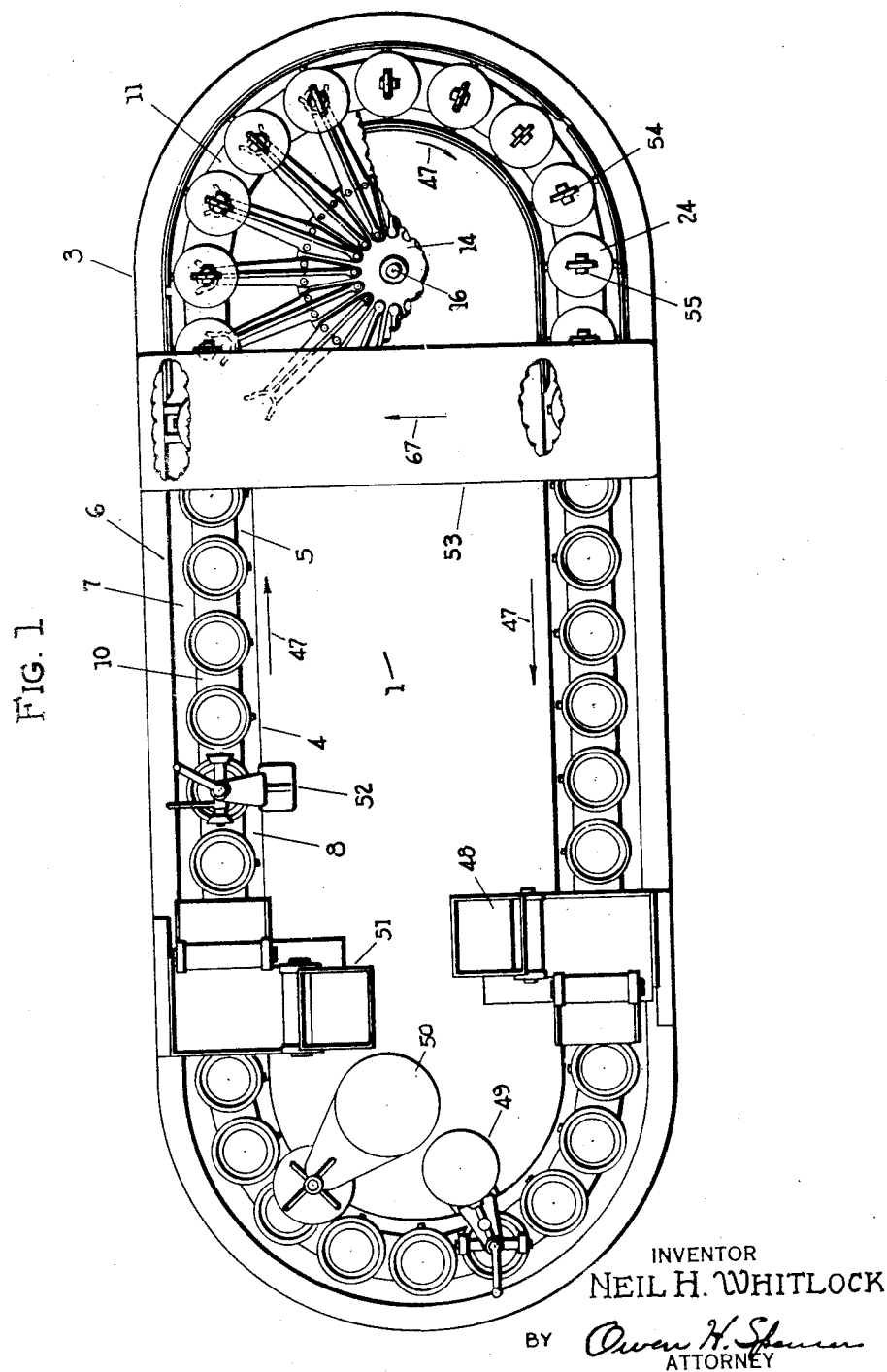
Figure 1 is a plan view of the invention certain regions being shown as torn away.
Figure 2:
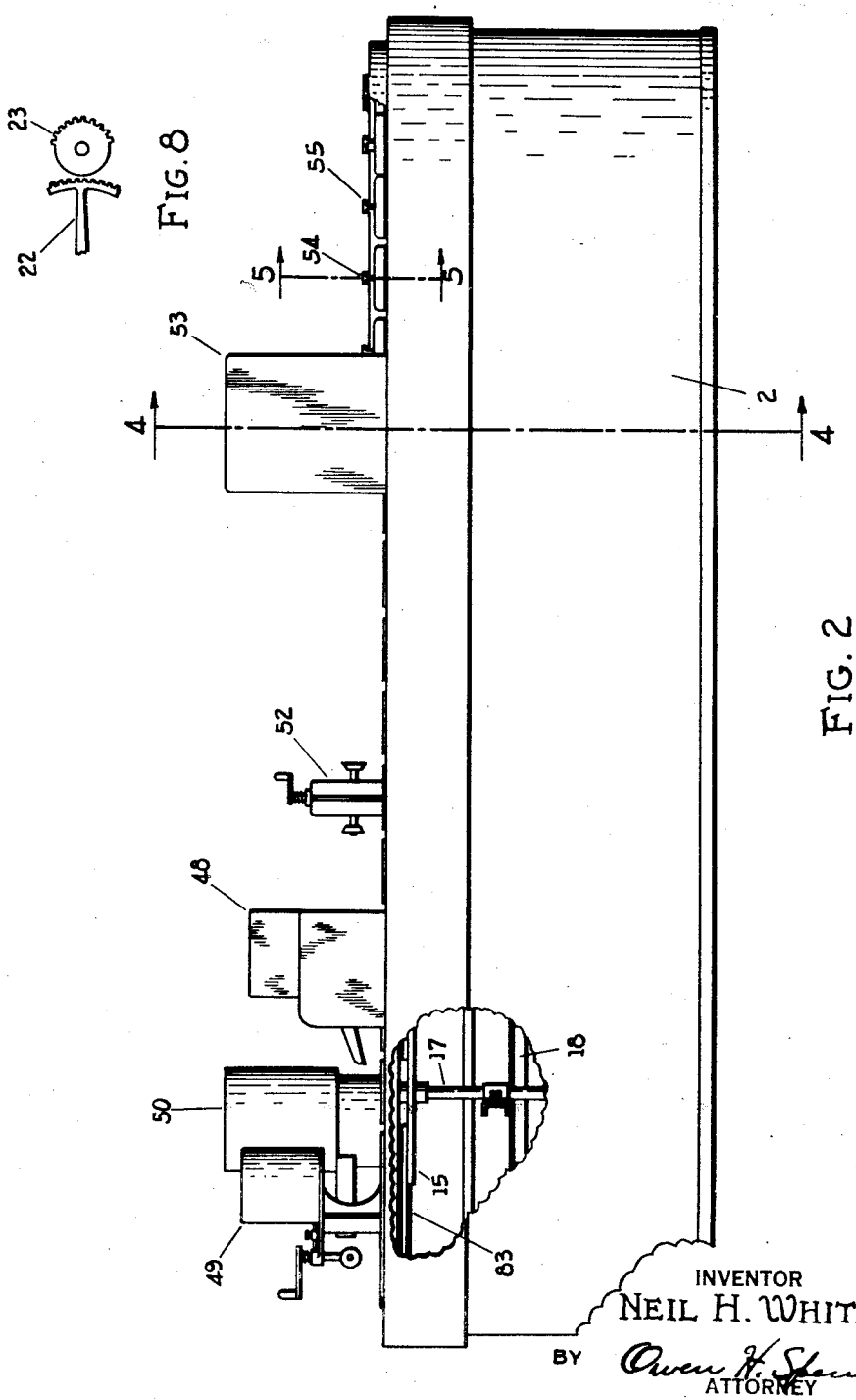
Fig. 2 is an elevational view of Fig. 1 certain parts being indicated as torn away.

Referring to Fig. 1 and Fig. 2 the numeral 1 designates the top plate of the frame 2 of the invention, which is of pronounced oblong design, said top plate forming a continuous channel 3 parallel to the contoural edge 4 of said top plate. Centrally between the inner side wall 5 and the outer side wall 6 of said channel, a continuous slot 7 is formed in the channel bottom 8.

Referring to Fig. 3 through Fig. 7, the rollers 9 of the conveyor links 10 run on said channel bottom different of said rollers contacting said bottom on different sides of said slot. Said links together form a continuous chain 11, each link having at one end a downwardly extending vertical trunnion 12 which engages a corresponding eyelet 13 in the adjacent end of the co-joining line; each link likewise having an eyelet which engages a trunnion formed on the adjacent end of the other co-joined link.

Each of the eyelets 13 is also of downwardly extending character. Below each of the eyelets 13, a roller 12A fits freely upon the respective trunnion and is retained thereon by the nut 13A. Said rollers are engaged by the sprockets 14 and 15 which are mounted upon the vertical shafts 16 and 17 at opposite ends of the apparatus, said shafts being journaled to cross members 18 and floor 19, of the frame 2, it being understood that each of said shafts is concentrically positioned with the channel slot 3 at the respective end of the mechanism.

In this example of the invention the sprocket 15 is driven by the motor 20, through the gearing 21, said motor being mounted on the floor 19. A part of said gearing consists of the comparatively large spur gear 22 mounted directly on the shaft 17, and said spur gear being driven by the intermittent gear 23, by which feature it will be seen that the chain 11 will be driven at regular intervals and in this connection attention is directed to the fact that the travel of said chain is equal in amount to the pitch of said chain, or in other words equal to the distance between a given point on one of the links 10 and the same respective point on either of the co-joined links.

On the trunnion end of each of the links 10, is seated one of the ovens 24 concentrically with the respective trunnion, said ovens being held firmly thereon by screws 25. Each of said ovens consists of a base wall 26, and cylindrical side wall 27. The peripheral edge of the pie pan shaped wall 28 joins said side wall at its upper edge, said pan shaped wall being a conical formation, and having a movable pan floor 29. Each of said pan floors is mounted on a vertical stem 30 which extends rotatably through the base wall 26 and journals through and extends considerably below the trunnion of the respective link 10. Each of said stems is provided at its lower end with a foot 31, and in the traveling path of these feet the cam 32 is positioned so that as the ovens are moved along with the chain 11, each of said feet in turn strikes said cam at the end of its baking operation, the respective pan floor 29 being forced upwardly to a position indicated by the dotted lines 33, as indicated by dotted lines 34 of Fig. 5, and as will be further explained.

In each oven an electrical heating element 35 and a thermostatic heat control 36 is secured between the pan shaped wall 28 and the base wall 26, one terminal 37 of said element being grounded to said base wall, and the other terminal being connected with the respective trolley brush 38 of each oven, said trolley brushes bearing in turn against the trolley bar 39 during the baking operation, said trolley bar being conveniently secured to and insulated from the inner side wall 5 of the channel 3 for a distance along said channel at one end of the apparatus. Said trolley being connected with a source of current supply feeds the respective heating element 35 with current through the trolley brush 38 and the safety heat control 36 which automatically prevents the temperature of the respective oven from reaching a degree too hot or too cold, it being understood that the ovens 24 pass along said trolley bar during the baking period and that said trolley bar ends at a point in advance of the cam 32.

The ovens 24 are provided with lids 40 each having a bell-mouthed cylindrical side wall 41 which serves to self guide the same onto the respective oven, the principal part of each of said lids being constructed of two spaced flat walls 42 between which in each lid a thermostatic heat control 43 and heating element 44 is located, the same being associated with the trolley bar 45 through the individual trolley brushes 46 in the same manner that the heating elements 35 and safety thermostatic controls 36 are associated with the trolley bar 39, the trolley bar 45, however, being conveniently secured to and insulated from the outer channel side wall 6, said trolley bars running parallel throughout their length.

The chain 11 is driven in the direction of the arrows 47, by the motor 20 and gearing 21, and as the ovens 24 are thus carried from the trolley bar 39 beyond the cam 32 through a cooling distance which extends to the pie bottom maker 48, and as each oven passes from thereunder the bottom dough for the respective pie is placed in each oven by the operator, each oven then passing to the edge wetter 49, the pie filler 50, the pie top maker 51, immediately after which the operator places on the top dough of the respective pie, and thence to the pie trimmer 52 from where the ovens travel an inspection distance into contact again with the trolley bar 39. As before mentioned the chain 11 is driven intermittently, and the different ovens are thus caused to pause in turn at said bottom dough maker, said wetter, said filler, said top dough maker and said trimmer a sufficient time for the respective operation at each.

It will be obvious that the oven lids 40 are used only during the baking operation for which reason a transfer mechanism 53 serves to withdraw the same from the ovens 24 as they pass beyond the trolley bar 45, and transfer same again to preceding ovens just prior to the contact of the trolley brushes 38 with the trolley bar 39. In constructing said lids to be thus transferred a keel 54 extends upwardly from each lid at right angles to the line of travel when carried with the ovens 24, each of said keels being provided with a pair of ears 55 which protrude on opposite sides thereof.

The aforesaid mechanism for transferring the lids from oven to oven comprises a pair of sprockets 56 and 57 which are mounted upon the horizontal shafts 58 and 59 said shafts being parallel to and over medial lines of opposite strands of the chain 11, said shafts being journaled through the bearing boxes 60 which are supported on the bars 61 by standards 62, said standards being conveniently secured to the top plate 1 of the apparatus.

Said pair of sprockets is provided with the chain 63 which travels across both strands of the chain 11. Spaced in said chain 63 are the special links 64 having vertically hanging spaced walls 65 which straddle, in turn, the keels 54 as the oven lids 40 are brought to position by the chain 11 to be thus straddled, said walls 65 having inwardly extending gibs 66 which pass under the ears 55 into engagement therewith. The lower strand of the chain 63 travels in the direction of the arrows 67, the gibs 66 sloping upwardly in the opposite direction so that as the link walls 65 pass well onto the respective keel 54 each lid 40 is cammed upwardly in turn out of engagement with the ovens 24, by contact of the gibs 66 with the ears 55, whereupon the ovens then travel with the chain 63, each to a position directly over one of the ovens 24 in the opposite strand of the chain 11, and as the respective lid strikes the overhanging stops 68, the respective oven having paused directly under the on-going lid, said lid restrained by said stops and the ears 55 being thus held from moving with the gibs 66, the lid drops in place on the said respective oven 24, and as said ears slide from said side walls, the respective special link 64 has started to bend as a part of the chain 63, about the sprocket 56, and said gibs being gradually tilted make it possible for said ears to pass therefrom with ease.

As above described the chain 11 carries the ovens 24 intermittently, and it is during the pause periods of said ovens that the lids 40 are engaged by the special links 64, the various parts being so constructed and timed as to stop a lid-bearing oven and a lid-receiving oven in line with the chain 63 during said pause periods, it being understood that during the travel periods of the ovens 24, the special links 64 travel clear of said ovens.

In order to thus drive the transfer chain 63 constantly, a worm gear 69 is mounted on one of the sprocket shafts 58, the worm 70 being mounted on the vertical shaft 71 so as to engage said worm gear, said vertical shaft being journaled through and extending considerably below one of the standards 62, into journaled relation with the bearing head 72. The vertical shaft 71 is provided at its lower end with the bevel gear 73, which meshes with another bevel gear 74, said other gear being mounted on the extended shaft 75 of the motor 20, the respective end of said extended shaft being also journaled in the bearing head 72.

The trolley bars 39 and 45 are comprised of different sections 76, 77, and 78, and 79, 80, and 81, respectively, by which arrangement more or less of said sections may be cut in or out of use by the switches 82, to thus vary and control the baking time of the ovens 24 and lids 40, as will be seen from Fig. 9.

Figure 3:
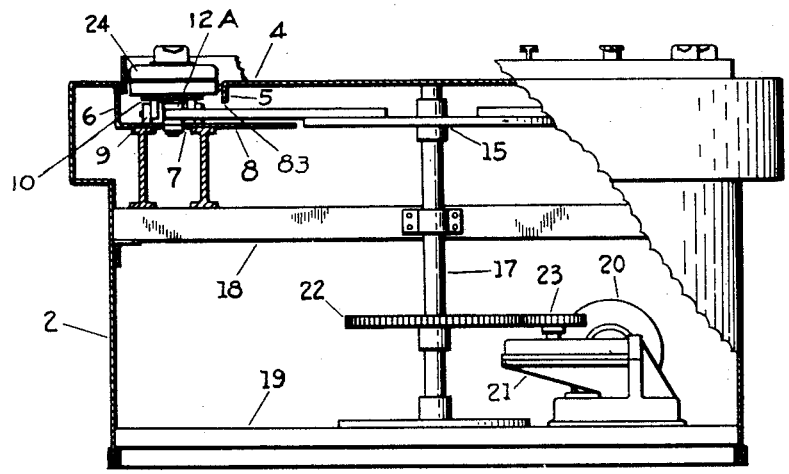
Fig. 3 is a fragmentary end view of Fig. 2.
Figure 4:
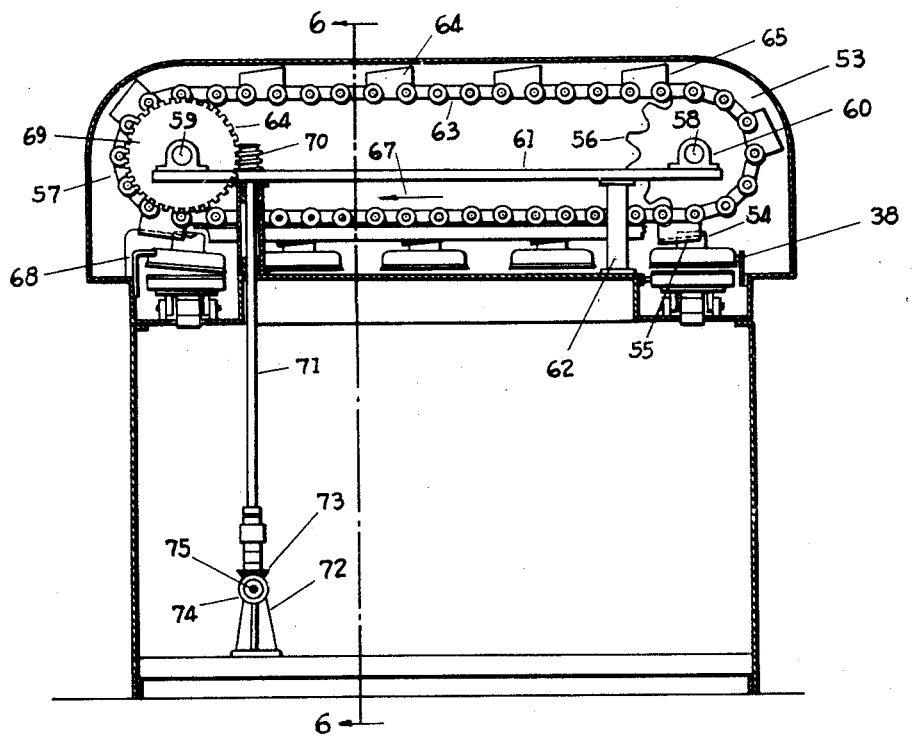
Fig. 4 is a cross-sectional view taken in the proximity of line 4—4 of Fig. 2.

By referring to Fig. 3, it will be observed that the sprocket wheels 14 and 15 engage the rollers 12A of the conveyor links 10, through slots 83, in the channel side wall 5, as will be more clearly understood by referring to Fig. 2, and Fig. 3.

Referring to Fig. 9 it will be seen that current is supplied to the switches 82 through rheostats 84 by which feature the temperature of the ovens may be regulated independently of the lids and vice versa, within safe limits as further controlled by the thermostatic controls 36 and 43 as above described.

While the description and drawings illustrate in a general way certain elements and arrangements thereof, which may be employed in carrying the invention into effect, it is obvious that many modifications may be made in the various details without departing from the scope of the appended claims, it being understood that the invention is not restricted to the particular example shown and described.

The invention claimed is:

1. A set of progressively arranged pie making mechanisms, a series of electrically operated ovens, chain means serving to move said ovens progressively to and from each of said pie making mechanisms, a means to make current connection with said ovens for a distance of their travel sufficient to maintain the baking time of each oven, a series of electrically heated oven lids carried by said ovens during the baking period, and a means serving to transfer said lids by-passingly in respect to said mechanisms, to the ovens as they reach the beginning of the baking period.

2. A set of progressively arranged pie making mechanisms, a series of electrically operated ovens, chain means serving to move said ovens progressively to and from each of said pie making mechanisms, a means to make current connection with said ovens for a distance of their travel sufficient to maintain the baking time of each oven, a series of electrically heated oven lids carried by said ovens during the baking period, a means serving to transfer said lids by-passingly in respect to said mechanism, to the ovens as they reach the beginning of the baking period, and means to vary the current to said ovens to vary the heat thereof during the baking period.

3. A set of progressively arranged pie making mechanisms, a series of electrically operated ovens, chain means serving to move said ovens progressively to and from each of said pie making mechanisms, a means to make current connection with said ovens for a greater or less distance of their travel as desired to vary the baking time of each oven, a series of electrically heated oven lids carried by said ovens during the baking period, and a means serving to transfer said lids by-passingly in respect to said mechanisms, to the ovens as they reach the beginning of the baking period.

4. A set of progressively arranged pie making mechanisms including a trolley bar, said trolley bar comprising separate end to end sections, a series of electrically operated ovens each of said ovens having a trolley bar brush, chain means serving to move said ovens progressively to and from each of said pie making mechanisms, and along said trolley bar through positions to hold said trolley bar brushes in contact with same, and means to connect more or less of said sections with a source of current supply to vary the baking time of said ovens.

5. A set of progressively arranged pie making mechanisms including a trolley bar comprising separate end to end trolley sections, a series of electrically operated ovens each of said ovens having a trolley bar brush, chain means serving to move said ovens progressively to and from each of said pie making mechanisms, and along said trolley bar through positions to hold said trolley bar brushes in contact with same, a series of oven lids carried by said ovens during the time said ovens move along said trolley bar, said oven lids having electrical heating elements, a means to transfer said lids from the ovens when immediately past said trolley bar to ovens immediately approaching said trolley, another trolley bar substantially parallel to the first trolley bar, also comprising separate end to end trolley sections, trolley brushes carried by said lids in contact with said other trolley bar when on said ovens, said other brushes being connected with said heating elements; and means to connect more or less of said sections with a source of current supply to vary the baking time of said ovens.

6. A set of progressively arranged pie making mechanisms including an oven, a series of pie receptacles, chain means serving to move said receptacles progressively to and from each of said pie making mechanisms, a series of lids carried by said receptacles while at said ovens, and a means serving to transfer said lids by-passingly in respect to the other of said mechanisms, to the receptacles as they reach said oven.

7. A set of progressively arranged pie making mechanisms including a trolley bar, said trolley bar comprising separate end to end sections, a series of electrically operated ovens each of said ovens having a trolley bar brush, chain means serving to move said ovens progressively to and from each of said pie making mechanisms, and along said trolley bar through positions to hold said trolley bar brushes in contact with same, means to connect more or less of said sections with a source of current supply to vary the baking time of said ovens, and means to vary the temperature of said ovens as desired.

8. A set of progressively arranged pie making mechanisms including a continuous track means, a trolley bar extending parallel to said track means for a distance and means to connect same to a source of electrical current supply, a series of electrically operated ovens, each of said ovens having a trolley bar brush; and chain means serving to move said ovens progressively to and from each of said pie making mechanisms, and along said track means through positions to hold said trolley bar brushes in contact therewith when passing same, a series of oven lids carried by said ovens during the time said ovens move along said trolley bar, and a means to transfer said lids from the ovens when immediately past said trolley bar to ovens immediately approaching said trolley bar.

9. A set of progressively arranged pie making mechanisms including a continuous track means, a trolley bar extending along said track means for a distance, a series of electrically operated ovens, each of said ovens having a trolley bar brush, means serving to move said ovens progressively to and from each of said pie making mechanisms, and along said track means through positions to hold said trolley bar brushes in contact therewith when passing same, a series of oven lids carried by said ovens during the time said ovens move along said trolley bar, said oven lids having electrical heating elements, a means to transfer said lids from the ovens when immediately past said trolley bar to ovens immediately approaching said trolley, another trolley bar substantially parallel to the first trolley bar, trolley brushes carried by said lids in contact with said other trolley bar when on said ovens, said other brushes being connected with said heating elements, and means to associate the sections of both trolleys with a source of current supply.

10. A set of progressively arranged pie making mechanisms including a continuous track means, a trolley bar extending parallel to said track means for a distance and comprising separate end to end trolley sections, a series of electrically operated ovens, each of said ovens having a trolley bar brush; means serving to move said ovens progressively to and from each of said pie making mechanisms, and along said track means through positions to hold said trolley bar brushes in contact therewith when passing same, a series of oven lids carried by said ovens during the time said ovens move along said trolley bar, a means to transfer said lids from the ovens when immediately past said trolley bar to ovens immediately approaching said trolley bar, and means to connect more or less of said sections with a source of current supply to vary the baking time of said ovens.

11. A set of progressively arranged pie making mechanisms including a continuous track means, a trolley bar extending along said track means for a distance and comprising separate end to end trolley sections, a series of electrically operated ovens, each of said ovens having a trolley bar brush, means serving to move said ovens progressively to and from each of said pie making mechanisms, and along said track means through positions to hold said trolley bar brushes in contact therewith when passing same, a series of oven lids carried by said ovens during the time said ovens move along said trolley bar, said oven lids having electrical heating elements, a means to transfer said lids from the ovens when immediately past said trolley bar to ovens immediately approaching said trolley, another trolley bar substantially parallel to the first trolley bar, also comprising separate end to end trolley sections, trolley brushes carried by said lids in contact with said other trolley bar when on said ovens, said other brushes being connected with said heating elements; means to connect more or less of said sections with a source of current supply to vary the baking time of said ovens, and means to vary the temperature of said oven and lid.

12. A set of progressively arranged pie making mechanisms including a continuous track means, a trolley bar extending along said track means for a distance and comprising separate end to end trolley sections, a series of electrically operated ovens, each of said ovens having a trolley bar brush, chain means serving to move said ovens progressively to and from each of said pie making mechanisms, and along said track means through positions to hold said trolley bar brushes therewith when passing same, a series of oven lids carried by said ovens during the time said ovens move along said trolley bar, said oven lids having electrical heating elements, a means to transfer said lids from the ovens when immediately past said trolley bar to ovens immediately approaching said trolley, another trolley bar substantially parallel to the first trolley bar, also comprising separate end to end trolley sections, trolley brushes carried by said lids in contact with said other trolley bar when on said ovens, said other brushes being connected with said heating elements; and means to vary the current to said ovens and lids independently of each other.

13. A set of progressively arranged pie making mechanisms including a track means, a trolley bar extending along said track means for a distance and comprising separate end to end trolley sections, a series of electrically operated ovens, each of said ovens having a trolley bar brush, chain means serving to move said ovens progressively to and from each of said pie making mechanisms, and along said track means through positions to hold said trolley bar brushes in contact therewith when passing same, a series of oven lids carried by said ovens during the time said ovens move along said trolley bar, said oven lids having electrical heating elements, a means to transfer said lids from the ovens when immediately past said trolley bar to ovens immediately approaching said trolley, another trolley bar substantially parallel to the first trolley bar, also comprising separate end to end trolley sections, trolley brushes carried by said lids in contact with said other trolley bar when on said ovens, said other brushes being connected with said heating elements; and means to connect more or less of said sections of either trolley bar selectively with a source of current supply to vary the baking time of said ovens and lids independently.

14. A set of progressively arranged pie making mechanisms including a track means, a trolley bar extending along said track means for a distance and comprising separate end to end trolley sections, a series of electrically operated ovens, each of said ovens having a trolley bar brush; means serving to move said ovens progressively to and from each of said pie making mechanisms, and along said track means through positions to hold said trolley bar brushes in contact therewith when passing same, means to connect more or less of said sections with a source of current supply to vary the baking time of said ovens, a series of oven lids carried by said ovens during the time said ovens move along said trolley bar, and a means to transfer said lids from the ovens when immediately past said trolley bar to ovens immediately approaching said trolley bar.

NEIL H. WHITLOCK.